Figure 3:
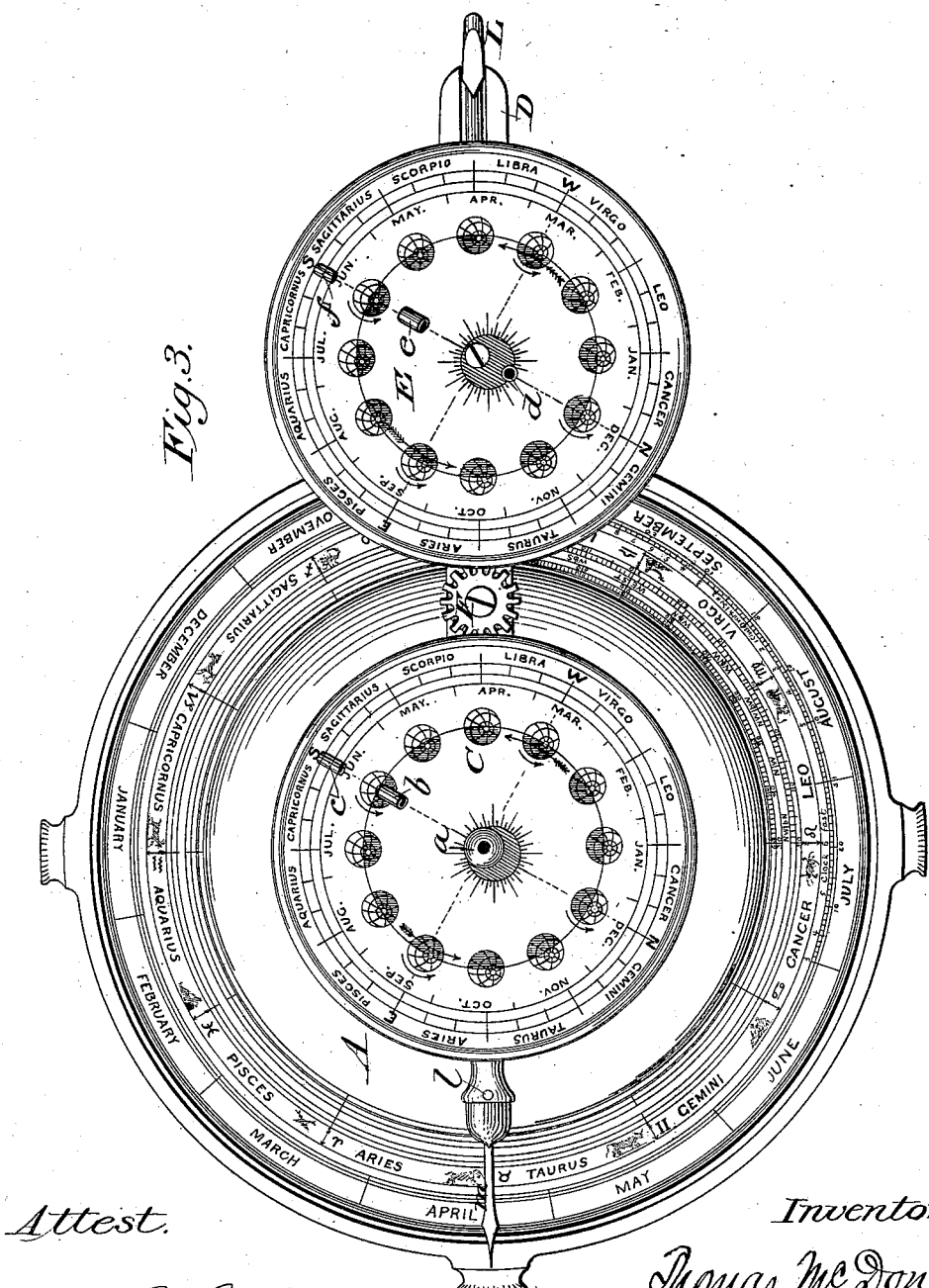

(No Model.) 2 Sheets—Sheet 1.
T. McDONOUGH.
EDUCATIONAL GLOBE.
No. 254,229. Patented Feb. 28, 1882.
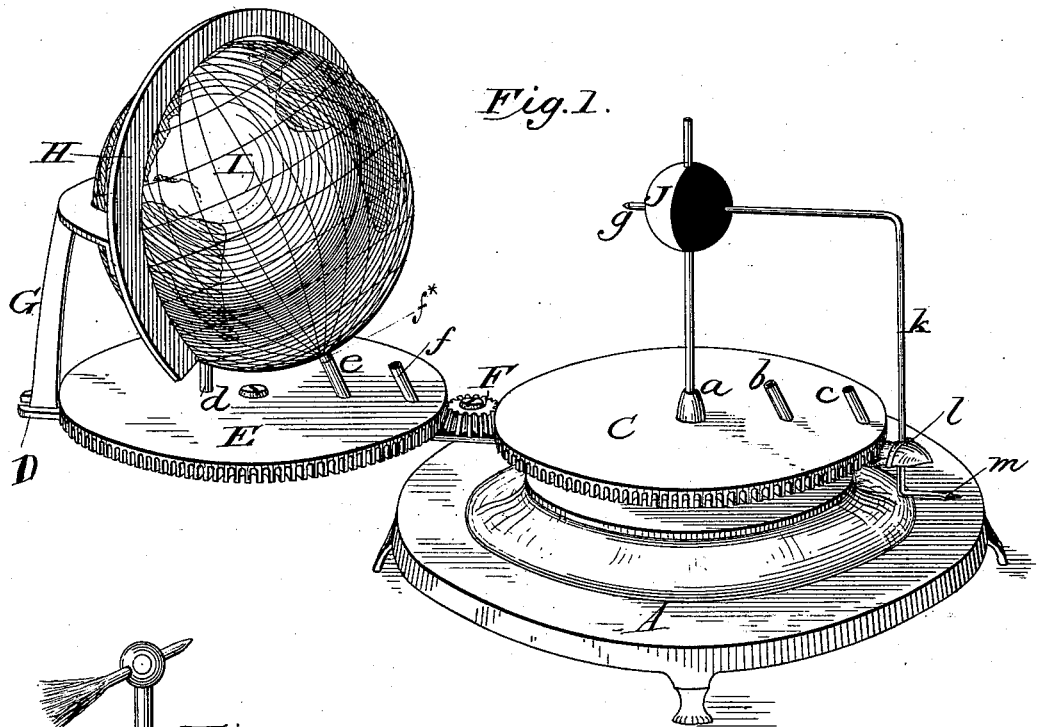
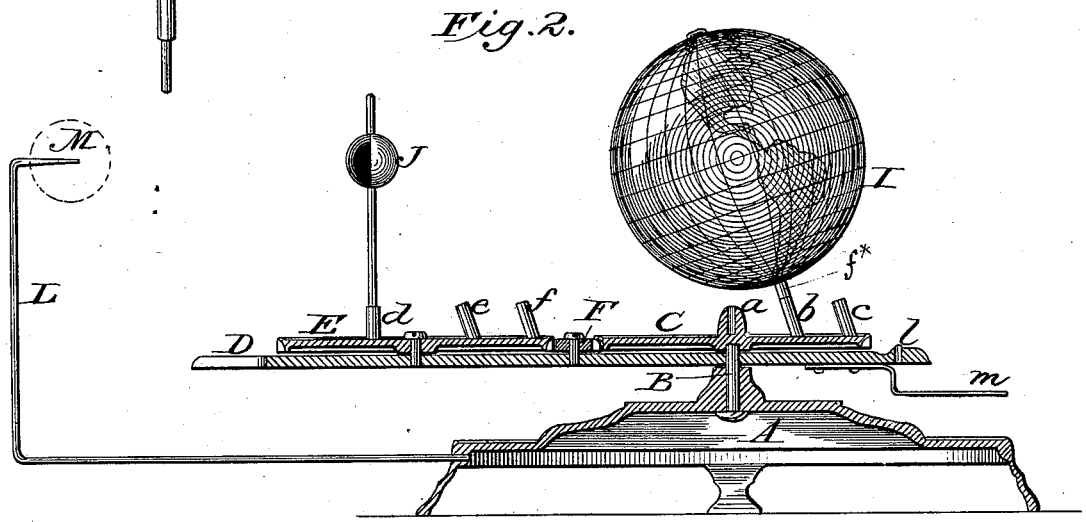
Attest
Sidney P. Hollingsworth
H. C. Hartemann
Inventor
Thomas McDonough
By his atty
Philip T. Dodge (No Model.)  2 Sheets—Sheet 2.

T. McDONOUGH.
EDUCATIONAL GLOBE.

No. 254,229. Patented Feb. 28, 1882.

Attest.
Sidney P. Hollingsworth
H. C. Huntemann

Inventor.
Thomas McDonough
By his Atty.
Philip T. Dodge

N. PETERS. Photo-Lithographer, Washington, D. C.

United States Patent Office.

THOMAS McDONOUGH, OF CHICAGO, ILLINOIS, ASSIGNOR OF ONE-HALF TO THOMAS KANE, OF SAME PLACE.

EDUCATIONAL GLOBE.

SPECIFICATION forming part of Letters Patent No. 254,229, dated February 28, 1882.

Application filed August 29, 1881. (No model.)

*To all whom it may concern:*

Be it known that I, THOMAS MCDONOUGH, of Chicago, in the county of Cook and State of Illinois, have invented certain Improvements in Educational Globes, of which the following is specification.

My invention relates to a convertible apparatus adapted for use as a tellurian or a lunarian at will, and also adapted for the purpose of illustrating the movement of comets.

The invention consists in the peculiar construction and combination of parts hereinafter described.

Referring to the accompanying drawings, Figure 1 represents a perspective view of my device adjusted for use as a tellurian; Fig. 2, a vertical central section of the same as it appears when adjusted for use as a lunarian; Fig. 3, a top plan view of the instrument with globes removed, showing the maps and diagrams employed on the various parts of the instrument; Fig. 4, a perspective view of the device employed to represent a comet.

A represents a circular base plate or frame designed to remain immovable. Upon the center of the base-plate there is secured firmly a non-rotating disk, C, having beveled-gear teeth formed in its under outer edge in the manner represented in the drawings.

Upon the central post, B, by which the disk C is supported, and beneath said disk, there is mounted a horizontally-revolving arm, D, upon the outer end of which there is journaled a toothed disk or wheel, E, similar in size and form to the disk C. The disk E is toothed in the same manner as the disk C, and is arranged to turn loosely about its own axis upon the arm D as it is carried by the latter around the central disk, C.

A pinion, F, mounted upon the middle of the revolving arm D, engages with the two disks C and E, and imparts motion from the former to the latter, the disk E receiving by the rotation of the arm D a motion around the central disk, C, and also through the pinion a rotation about its own axis.

By forming the gear-teeth in the under edges in the manner shown, and providing the pinion with correspondingly-inclined teeth, I am enabled to leave the upper surfaces of the disk smooth and unbroken to receive maps and diagrams, as will be presently described, and at the same time I am enabled to place the disks in close proximity to the supporting-arm and connect them by means of a single horizontal pinion.

The central disk, C, is provided with a central hole or socket, *a*, and also at different distances from the center with two inclined sockets, *b* and *c*. The outer disk, E, is provided with a vertical socket, *d*, located outside of the center, and also with two inclined sockets, *e* and *f*, located at different distances from the center, as is clearly indicated in the drawings. The various sockets are to be made of equal size, in order that the attachments hereinafter described may be transferred from one to another.

The outer end of the horizontal arm D is slotted to receive the lower end of a standard, G, the upper end of which bears a semicircular plate supporting a meridian-ring, H, commonly known as the "day and night ring," employed when the apparatus is used as a tellurian. The standard G is secured to the arm by means of the thumb-nut applied to its lower end, so that it may be removed with the meridian-ring at will.

I is a globe representing the earth, having its surface provided with the usual maps and graduations indicating the lines of latitude and longitude, the line of the ecliptic, &c. This globe is provided with a spindle, $f^*$, lying in line with the axis of rotation, adapted for insertion into either of the various sockets upon the disks; and J is a globe, used to represent the sun or the moon, as occasion may require, provided with a sustaining stem or spindle, which may be applied to either of the various sockets. The moon-globe J has one half of its circumference darkened or colored black, while the other half is of light color. A pointer, *g*, is applied to one side of the globe J to indicate the direction of the sun's rays, when required, and a detachable angular wire, *k*, is provided as a means of securing the rotation of said globe, when desired, this wire being applied when the device is used as a tellurian, by inserting one end in the side of the globe J, and the opposite end into a socket, *l*, formed for the purpose in the inner end of the arm D. In this manner the bright face of the globe J is maintained toward the earth, and the pointer caused to indicate the point at which the sun's rays fall vertically upon the earth.

A rigid arm, L, extending outward and upward from one side of the base-plate has its upper end fashioned into suitable form, or provided with a globe, M, to represent the sun when the device is used as a lunarian.

In making use of the apparatus as a tellurian the globe J is applied, as shown in Fig. 1, to the central socket of the apparatus, and the angular wire k applied to connect it with the revolving arm D, in order to secure the rotation of the said globe J and maintain the presentation of its light side to the earth. The earth-globe I is mounted upon the inclined socket e or f of the outer disk, E. When mounted in the socket e the center of the earth will coincide with the axial line of the disk E, permitting the meridian-ring H to be employed in connection with the earth-globe. The arm D being now carried around and the earth at the same time revolving, the apparatus will illustrate the general movement of the earth with relation to the sun, the cause of the day and night following each other, the changes of the seasons, and the varying length of the days and nights, but will not illustrate the eccentricity of the earth's orbit.

In order to illustrate the eccentricity of the earth's orbit, the spindle of the earth-globe is applied to the outer socket, f, thus rendering the earth eccentric to the disk E, and the standard G, with its ring H, is removed. When thus arranged the rotation of the arm D will cause the earth to be carried about the sun-globe J in an eccentric path.

In addition to the other purposes named, the apparatus will show the reason why the sun is apparently higher in summer than in winter; why shadows in the southern hemisphere point south during the summer season; why the earth is nearer the sun in winter than in summer; why the days and nights are of six months' duration at the poles, and other phenomena known in nature.

When the apparatus is to be used as a lunarian the arm L is applied to represent the sun, the earth placed upon the socket b of the central disk, C, and the moon J placed upon the vertical eccentric socket of the outer disk, E. When thus adjusted the rotation of the arm D causes the moon to be carried about the earth, and at the same time to be carried in a circular path about the axis of the disk E. The apparatus thus adjusted illustrates the eclipses of the sun and moon, the various phases of the latter, and numerous other facts.

In order the more clearly to represent the various positions of the earth with reference to the sun, the position of the earth at the different seasons of the year, &c., the disks C and E are each provided on the upper surface with a map or diagram divided at its circumference into sections, marked to indicate the months of the year, the corresponding signs of the zodiac, and provided with representations or illustrations of the earth and sun, as plainly shown in the drawings.

The base-plate A is provided upon its circumference with divisions and diagrams indicating the signs of the zodiac, the months of the year, the points of the compass, and the hours of the day. The inner end of arm D is provided, as shown, with a pointer, m, which is carried by the rotation of the arm over the graduated face of the base-plate. By means of this pointer the arm and the parts attached thereto may be readily adjusted to show the relative position of the earth and sun at any particular day or hour.

As a means of illustrating the movement and axial position of comets, I provide a device, such as represented in Fig. 4, consisting of a standard adapted to fit the outer socket, f, and provided at its upper end with a miniature representation of a comet, consisting of a pointer provided with a spreading tail.

In making use of this device the apparatus is arranged as in Fig. 1, except that the earth-globe I and the meridian-ring are removed, and the comet-standard inserted in the outer socket, f, of disk E, the tail of the comet being directed away from the sun at the time the socket f is in its nearest position to the center of the apparatus. The apparatus being set in motion, the comet will be caused to travel in an eccentric path around the sun, maintaining a fixed axial inclination.

Having thus described my invention, what I claim is—

1. The combination of the central stationary disk provided with a central socket and an inclined eccentric socket, the second disk revolving upon its own axis and also around the stationary disk, and provided with an eccentric socket, and the two globes adapted for application to the sockets and to be transposed or exchanged one for the other, substantially as described and shown.

2. The combination of the base-frame, the horizontal revolving arm, the central stationary toothed disk provided with the vertical and the inclined sockets, the outer toothed disk pivoted upon the arm and provided with the vertical and inclined sockets, and the pinion mounted upon the arm and connecting the two disks, as shown and described.

3. In combination with a horizontally-rotating arm, a revolving disk mounted upon its outer end and provided with two inclined sockets, e and f, and an earth-globe, I, adapted for application to either of said sockets at will.

4. In combination with a tellurian and lunarian, two disks of equal size connected by an intermediate pinion, one fixed and the other caused to revolve around the same, in combination with inclined sockets upon both disks, the vertical socket at the center of the non-rotating disk, the earth and sun globes, each adapted to be applied to either of the various sockets, as required, whereby the transposition of the globes is permitted to illustrate the different phenomena of nature.

5. In combination with the central disk and the outer disk revolving around the same and geared therewith, an earth-globe adapted and arranged for eccentric attachment to the inner disk, and the moon-globe adapted and arranged for eccentric attachment to the outer disk, as described and shown.

6. The combination of the base-frame, the stationary toothed disk C, arm D, revolving disk E, pinion F, globes I and J, and arm L.

7. In a combined tellurian and lunarian, the stationary base-frame, the central disk, the outer disk revolving around the central disk, the sun and moon globes applicable to the disks and interchangeable at will, in combination with diagrams and graduations indicating the months and seasons applied to the two disks and base, as described and shown.

8. The disks C and E, having teeth formed in their under inner edges, in combination with the supporting-arm D and the intermediate pinion F, having its outside constructed and arranged to engage with the under edges of the disks, as and for the purpose described.

9. The combination of a central stationary disk provided with an eccentric inclined socket, the horizontally-revolving arm, the pinion, the outer disk mounted upon the arm, and also provided with an eccentric inclined socket, and the two interchangeable globes adapted for application to the sockets, as described and shown.

10. The disk E, arranged to revolve upon its own axis and also around the central disk, and provided with the vertical socket $d$ and inclined socket $e$, adapted to receive the globes, as described and shown.

11. In combination with the revolving arm, the disks C and E, constructed and arranged to operate as described, the earth-globe upon the outer disk, the central sun-globe, J, the connection K, extending from the outer end of arm D to the central globe, J, independent of the outer globe, and the pointer $g$, as described and shown.

12. A miniature comet consisting of a standard provided with a pointer and an expanded tail extending in opposite directions, as described and shown.

THOMAS McDONOUGH.

Witnesses:
W. W. CALKINS,
T. BART McDONOUGH.